E. I. DODDS.
STAY BOLT.
APPLICATION FILED SEPT. 21, 1912.
1,077,051.
Patented Oct. 28, 1913.
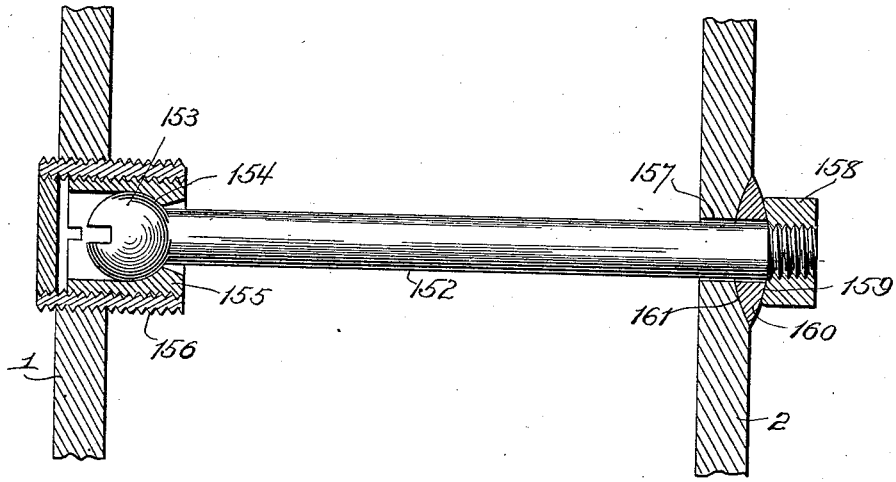
WITNESSES
INVENTOR

UNITED STATES PATENT OFFICE.

ETHAN I. DODDS, OF CENTRAL VALLEY, NEW YORK, ASSIGNOR, BY MESNE ASSIGNMENTS, TO FLANNERY BOLT COMPANY, OF PITTSBURGH, PENNSYLVANIA.

STAY-BOLT.

1,077,051.  Specification of Letters Patent.  Patented Oct. 28, 1913.

Original application filed September 25, 1911, Serial No. 651,051. Divided and this application filed September 21, 1912. Serial No. 721,673.

*To all whom it may concern:*

Be it known that I, ETHAN I. DODDS, a citizen of the United States, residing at Central Valley, in the county of Orange and State of New York, have invented certain new and useful Improvements in Stay-Bolts; and I do hereby declare the following to be a full, clear, and exact description of the invention, such as will enable others skilled in the art to which it appertains to make and use the same.

This invention relates to flexible bolts such as are employed for connecting the outside and inside plates of locomotive and other boilers, and is a division of application Serial Number 651,051, filed September 25th, 1911.

The object of the invention is to provide an improved stay bolt capable of a universal angular movement or yield at or near both ends thereof, so that the stay-bolt will be relieved of any vibration due to the expansion of the fire-box and crown sheets, and permitting the sheets to expand and contract at will.

Another object of the invention is to provide a stay-bolt that can readily be applied from the inside without the trouble and expense of dismantling the engine, and can be adjusted at any time, if necessary.

The accompanying drawing is a view partly in elevation and partly in section of a bolt embodying my invention.

1 represents the outside plate of a locomotive boiler, 2 the inside plate. The outside plate 1 is provided with a threaded hole to receive the tubular bushing 156, which is threaded externally for its attachment to the wall 1 and threaded internally to engage the inner tubular bushing 155, which is provided internally with a concave seat 154, against which the spherical head 153 of the bolt shank 152 rests. This head is integral with the bolt shank and is grooved to be engaged by a suitable tensioning tool, and the inner bushing 155 is also provided with notches in outer edge to be engaged by a spanner whereby it may be adjusted with relation to the head of the bolt shank. The opposite end of the bolt shank is threaded and passed through a somewhat enlarged hole 157 formed in the wall 2, and is engaged at its threaded end by the nut 158 having a concave inner face 159, which has a swiveled bearing on one face of the double convex washer 160, the opposite convex face of this washer resting in a concave seat 161 formed in the outer side of wall or plate 2 and coaxially with the opening 157. The hole through washer 160, is preferably as large as the hole through the plate 2 so as to permit of the comparatively free movement of the bolt within the washer. With this construction the nut 158 may move on the washer or the washer move on the plate and thus leaving the bolt practically free for angular movement throughout its length.

As shown the bearing of the head 153 is intermediate the two walls 1 and 2, while the bearing at the other end of the bolt is in a plane to the outer side of the inside wall 2, but if desired the bolt may be made longer and the inner bushing 155 so located that the head 153 will have its bearing in the plane of the outer wall 1, or to the outside of said wall. I also prefer to close the outer bushing by the plug as shown.

Having fully described my invention what I claim as new and desire to secure by Letters-Patent, is:—

1. A stay bolt for boilers consisting of a bolt shank having a spherical head at one end, a tubular bushing secured to one wall of the boiler and having a concave seat for said head, a washer loosely mounted on the bolt shank and provided with a curved face resting in a curved seat in outer face of the other wall of the boiler and a nut secured to said bolt shank and bearing against the washer.

2. A stay bolt for boilers consisting of a bolt shank having an integral spherical head at one end and threaded at its other end, a tubular bushing adapted for attachment to a wall of the boiler and provided with an annular concave seat for the integral head of the bolt shank, a washer loosely mounted on the threaded end of the shank and bearing against the outer face of the outer wall of the boiler, the said washer having a convex outer face and a nut screwed to the shank and provided with a concave inner face adapted to bear against the curved face of the washer.

3. A stay bolt for boilers comprising a bolt shank having a spherical head at one end, a tubular bushing having an annular seat for said head, and a double convex washer loosely mounted on the other end of said bolt and a nut secured to said bolt and having a concave face to engage one face of said washer.

4. The combination with inner and outer walls of a boiler, one of said walls having a hole through same and a concave seat surrounding the hole, and a bushing mounted in the other wall and provided with an annular concave seat, of a bolt shank having a spherical head adapted to rest against the seat in the bushing, a double convex washer loosely mounted on the bolt shank and resting in the concave seat in the wall and a nut threaded onto the bolt and having a concave face bearing against one face of the double convex washer.

In testimony whereof, I have signed this specification in the presence of two subscribing witnesses.

ETHAN I. DODDS.

Witnesses:
A. W. BRIGHT,
GEO. F. DOWNING.

Copies of this patent may be obtained for five cents each, by addressing the "Commissioner of Patents, Washington, D. C."